(12) United States Patent
Noh et al.

(10) Patent No.: US 7,543,965 B2
(45) Date of Patent: Jun. 9, 2009

(54) SIDE LIGHT-EMITTING DEVICE, BACKLIGHT UNIT HAVING THE SIDE LIGHT-EMITTING DEVICE, AND LIQUID CRYSTAL DISPLAY APPARATUS EMPLOYING THE BACKLIGHT UNIT

(75) Inventors: Ji-whan Noh, Suwon-si (KR); Dong-ha Kim, Suwon-si (KR); Joon-chan Park, Anyang-si (KR); Kye-hoon Lee, Suwon-si (KR)

(73) Assignee: Samsung Electronic Co., Ltd, Suwon-si (KR)

( * ) Notice: Subject to any disclaimer, the term of this patent is extended or adjusted under 35 U.S.C. 154(b) by 223 days.

(21) Appl. No.: 11/259,283

(22) Filed: Oct. 27, 2005

(65) Prior Publication Data

US 2006/0092663 A1     May 4, 2006

(30) Foreign Application Priority Data

Oct. 29, 2004   (KR) .............. 10-2004-0087059

(51) Int. Cl.
*F21V 7/00*   (2006.01)
(52) U.S. Cl. .............. 362/307; 362/308; 362/310
(58) Field of Classification Search ......... 362/296–305, 362/307, 308, 310, 311, 329, 330, 339, 800, 362/561, 555, 612, 559; 349/61–63; 257/98
See application file for complete search history.

(56) References Cited

U.S. PATENT DOCUMENTS

| | | | |
|---|---|---|---|
| 6,598,998 B2 * | 7/2003 | West et al. .......... | 362/307 |
| 6,607,286 B2 | 8/2003 | West et al. | |
| 6,674,096 B2 * | 1/2004 | Sommers .......... | 257/98 |
| 6,679,621 B2 * | 1/2004 | West et al. .......... | 362/327 |
| 6,709,122 B2 * | 3/2004 | Adachi et al. .......... | 362/27 |
| 6,972,439 B1 * | 12/2005 | Kim et al. .......... | 257/98 |

(Continued)

FOREIGN PATENT DOCUMENTS

JP      63-20464      2/1988

(Continued)

OTHER PUBLICATIONS

Korea Office Action dated Jul. 20, 2006 issued in KR 2004-87059.

*Primary Examiner*—Bao Q Truong
(74) *Attorney, Agent, or Firm*—Stanzione & Kim, LLP

(57) ABSTRACT

A side light-emitting device, a backlight unit using the side light-emitting device as a light source, and a liquid crystal display (LCD) apparatus employing the backlight unit. The side light-emitting device includes a light-emitting device to generate light and a side emitter disposed adjacent to the light-emitting device to emit the light incident from the light-emitting device in a lateral direction. The side emitter includes a reflecting surface to reflect incident light, and a reflecting/refracting surface to totally internally reflect light incident directly from the light-emitting device to the reflecting surface and to refract the light incident from the reflecting surface so that the refracted light propagates in the lateral direction. Since the side light-emitting device emits most the light in the lateral direction, using the side light-emitting device as a light source in a backlight unit allows light to be mixed evenly.

38 Claims, 4 Drawing Sheets

U.S. PATENT DOCUMENTS

| | | |
|---|---|---|
| 7,083,313 B2 * | 8/2006 | Smith .......................... 362/555 |
| 7,118,262 B2 * | 10/2006 | Negley ........................ 362/555 |
| 2005/0001537 A1 * | 1/2005 | West et al. .................. 313/500 |
| 2006/0013002 A1 * | 1/2006 | Coushaine et al. .......... 362/308 |

FOREIGN PATENT DOCUMENTS

| | | |
|---|---|---|
| JP | 7-202270 | 8/1995 |
| JP | 8-139344 | 5/1996 |
| JP | 9-18058 | 1/1997 |
| JP | 9-97927 | 4/1997 |
| JP | 9-232636 | 9/1997 |
| JP | 10-82916 | 3/1998 |
| JP | 2000-299500 | 10/2000 |
| JP | 2002-57375 | 2/2002 |
| JP | 2003-8081 | 1/2003 |
| JP | 2003-158302 | 5/2003 |
| JP | 2004-87630 | 3/2004 |
| JP | 2004-88007 | 3/2004 |

* cited by examiner

SIDE LIGHT-EMITTING DEVICE, BACKLIGHT UNIT HAVING THE SIDE LIGHT-EMITTING DEVICE, AND LIQUID CRYSTAL DISPLAY APPARATUS EMPLOYING THE BACKLIGHT UNIT

CROSS-REFERENCE TO RELATED APPLICATIONS

This application claims the benefit of Korean Patent Application No. 10-2004-0087059, filed on Oct. 29, 2004, in the Korean Intellectual Property Office, the disclosure of which is incorporated herein in its entirety by reference.

BACKGROUND OF THE INVENTION

1. Field of the Invention

The present general inventive concept relates to a side light-emitting device, a backlight unit using the side light-emitting device as a light source, and a liquid crystal display (LCD) apparatus employing the backlight unit.

2. Description of the Related Art

A liquid crystal display (LCD) is a non-emissive (i.e., passive) flat panel display that needs an external light source to produce an image, since the LCD itself does not emit light. A backlight unit is located behind the LCD and emits light.

Backlight units are classified as direct light type backlight units and edge light type backlight units according to the position in which a light source is arranged. For a direct light type backlight unit, a plurality of light sources disposed beneath an LCD directly emit light onto an LCD panel. For an edge light type backlight unit, a lamp located along an edge of a light guide panel (LGP) emits light onto the LCD panel via the LGP.

The direct light type backlight unit may use light-emitting diodes (LEDs) that emit Lambertian radiation as a point light source. When color light beams emitted by a LED are diffused by a diffusion plate to illuminate the LCD panel, a side-emitting LED that allows the light beams emitted from sides thereof to propagate in a slightly lateral direction and enter the diffusion plate is needed to prevent the color light beams emitted by the LED to be visible from above the diffusion plate.

FIG. 1 is a cross-sectional side view of a conventional side emitter 1 of a side-emitting LED disclosed in U.S. Pat. No. 6,679,621. Referring to FIG. 1, the conventional side emitter 1 includes a funnel-shaped reflecting surface 3 sloped with respect to a central axis c', a first refracting surface 5 obliquely inclined with respect to the central axis c' to refract light rays reflected by the reflecting surface 3, and a second refracting surface 7 extending as a convex curve from a bottom surface 9 to the first refracting surface 5.

Light that is emitted from a LED (not shown) into the bottom surface 9 of the conventional side emitter 1 and is incident on the reflecting surface 3 is reflected by the reflecting surface 3 to the first refracting surface 5 and is refracted by the first refracting surface 5 to exit the side emitter 1 in a substantially lateral direction. On the other hand, light that is emitted from the LED into the side emitter 1 and is incident on the second refracting surface 7 is transmitted through the second refracting surface 7 to exit the side emitter 1 in the substantially lateral direction.

In the conventional side-emitting LED, light propagating at about 10° upward from a horizontal axis has the highest intensity. Thus, light must be spread out over a wider area in order to obtain a slim backlight unit and an LCD having uniform screen brightness. However, the conventional side-emitting LED cannot satisfy this requirement.

Another drawback of the conventional side-emitting LED is that it is difficult to manufacture due to the complicated structure of the reflecting surface 3, the first refracting surface 5, and the second refracting surface 7 having a curved shape.

SUMMARY OF THE INVENTION

The present general inventive concept provides a simple side light-emitting device that is easy to manufacture and emits light over a wide area, a slim backlight unit using the side light-emitting device as a light source, and a liquid crystal display (LCD) apparatus employing the backlight unit.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a side light-emitting device including a light-emitting device to generate light and a side emitter disposed adjacent to the light-emitting device to emit the light incident from the light-emitting device in a lateral direction. The side emitter includes a reflecting surface to reflect incident light, and a reflecting/refracting surface to totally internally reflect light incident directly from the light-emitting device to the reflecting surface and to refract the light incident from the reflecting surface so that the refracted light propagates in the lateral direction.

The reflecting surface may be coated with reflective coating. The reflecting surface may be a conical surface centered around a central axis of the side light-emitting device to reflect incident light in a direction away from the central axis. The reflecting/refracting surface may be an inclined surface that widens away from the central axis as a distance from the light-emitting device increases.

The reflecting surface and the reflecting/refracting surface may be formed such that while first light within a first range of about 45° to about 135° with respect to a horizontal axis including an origin at a light-emitting point of the light-emitting device is directly incident on the reflecting surface, the horizontal axis being perpendicular to the central axis of the side light-emitting device, second light within second ranges of about 10° to about 45° and of about 135° to about 170° with respect to the horizontal axis is incident on the reflecting/refracting surface so that the incident light is totally internally reflected by the reflecting/refracting surface to the reflecting surface.

The reflecting surface and the reflecting/refracting surface may be symmetric about the central axis of the side light-emitting device.

The foregoing and/or other aspects of the present general inventive concept may also be achieved by providing a backlight unit including a base plate, an array of side light-emitting devices (as described above) disposed on the base plate, a reflective diffusion plate disposed below the array of side light-emitting devices that reflects and diffuses incident light, and a first transmissive diffusion plate disposed above the array of side light-emitting devices that transmits and diffuses incident light.

The array of the side light-emitting devices may include alternately arranged side light-emitting devices emitting red, green, blue color beams, respectively, or side light-emitting devices emitting white light.

The backlight unit may further include an optical plate disposed between the first transmissive diffusion plate and the array of the side light-emitting devices, and a plurality of reflecting mirrors disposed on one surface of the optical plate that reflect light emitted directly upward from corresponding ones of the side light-emitting devices. The optical plate may be made of transparent polymethyl methacrylate (PMMA) or may be a second transmissive diffusion plate.

The backlight unit may further include at least one of a brightness enhancement film (BEF) to improve directionality of light beams passing through the first transmissive diffusion plate and a polarization enhancement film to increase efficiency of polarization.

The foregoing and/or other aspects of the present general inventive concept may also be achieved by providing a liquid crystal display apparatus including a liquid crystal panel, and the backlight unit (as described above) to emit light beams on the liquid crystal panel.

The foregoing and/or other aspects of the present general inventive concept may also be achieved by providing a side light emitting device, including a side emitter having a central axis, a reflective surface extending at an inner end thereof at 360 degrees from the central axis at a first incline with respect to a lateral axis perpendicular to the central axis, and a refractive/reflective surface connected at an outer end at 360 degrees to the reflective surface, the reflective surface being arranged at a second incline with respect to the lateral axis to receive first light beams reflected from the reflective surface and to transmit the first light beams out of the side emitter along the lateral axis and to reflect second light beams received from a point light source to the reflective surface.

The foregoing and/or other aspects of the present general inventive concept may also be achieved by providing a side light emitting device, including a point light source, and a side emitter having an inner surface to reflect light and an outer surface to reflect a first one or more light beams and to refract a second one or more light beams, and the inner and outer surfaces extend away from a central axis of the side light emitting device and have a predetermined distance therebetween that decreases as the inner and outer surfaces extend away from the central axis of the side light emitting device.

The foregoing and/or other aspects of the present general inventive concept may also be achieved by providing a side light emitting device, including a base and a side emitter. The side emitter includes a transparent body, the transparent body being bound at an upper part by a reflective surface and bound at a lateral part by a reflective/refractive surface such that the first and second reflective surfaces meet at a portion of the transparent body that is furthest from a central axis thereof.

The foregoing and/or other aspects of the present general inventive concept may also be achieved by providing a side emitter usable in a side light emitting device, including a transparent body having a base surface through which beams are received from a point light source, a first boundary surface to reflect the beams received from the point light source, and a second boundary surface connected to the first boundary surface and the base surface to refract beams received from the first boundary surface and to reflect beams received from the point light source to the first boundary surface.

The foregoing and/or other aspects of the present general inventive concept may also be achieved by providing a side emitter, including a base, a point light source disposed on the base, and a body. The body includes a first upper surface having a first cone shape having a first angle with respect to a central axis thereof, and a second lateral surface having a second cone shape having a second angle with respect to the central axis thereof and extending substantially close to the base.

The foregoing and/or other aspects of the present general inventive concept may also be achieved by providing a side emitter usable in a backlight unit, the side emitter including a transparent body having a base, an upper funnel shaped surface, and at least one planar lateral surface to connect the upper funnel shaped surface to the base.

The foregoing and/or other aspects of the present general inventive concept may also be achieved by providing a side emitter usable with a backlight, the side emitter including a light source to emit first and second beams in first and second directions, and a body having first and second surfaces to form an external appearance thereof, the second surface reflecting the second beam toward the first surface, the first surface reflecting the first beam and the second beam reflected from the second surface toward the second surface, and the second surface refracting the reflected first beam and the reflected second beam in a lateral direction of the body.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
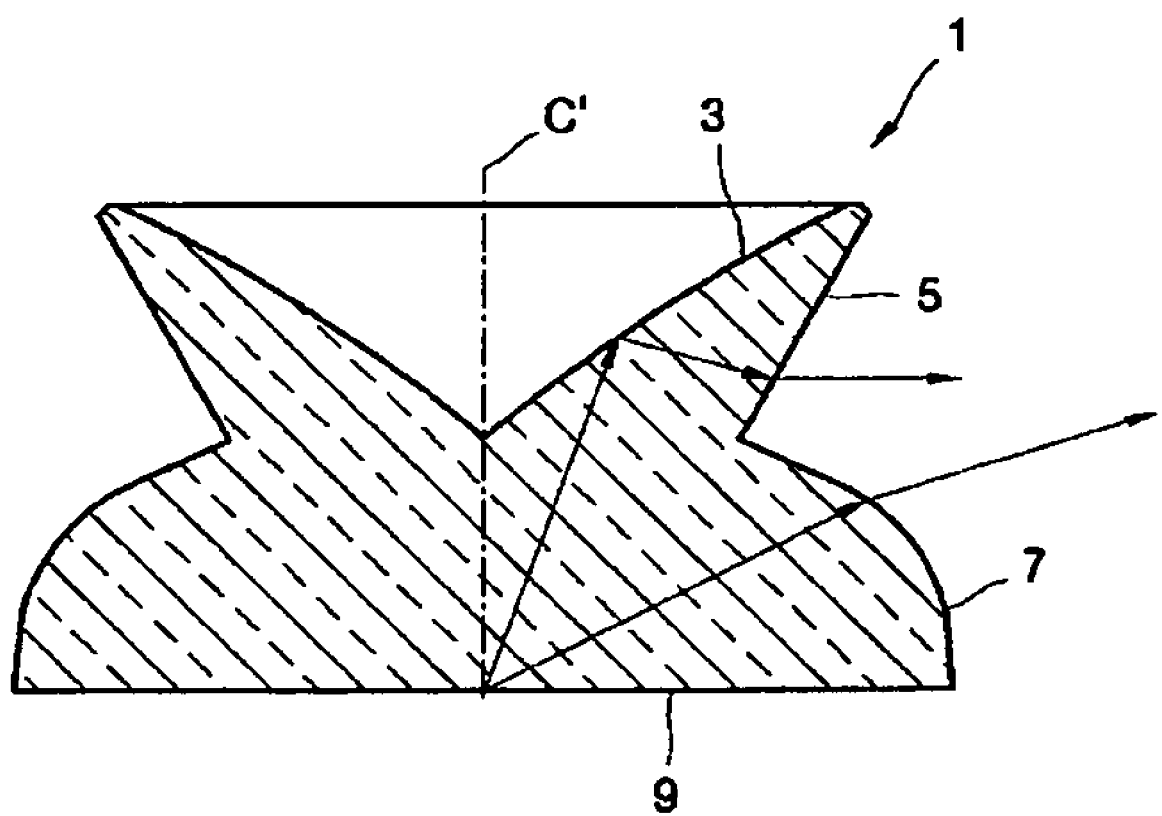
FIG. 1 is a cross-sectional side view of a conventional side emitter in a side-emitting LED.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
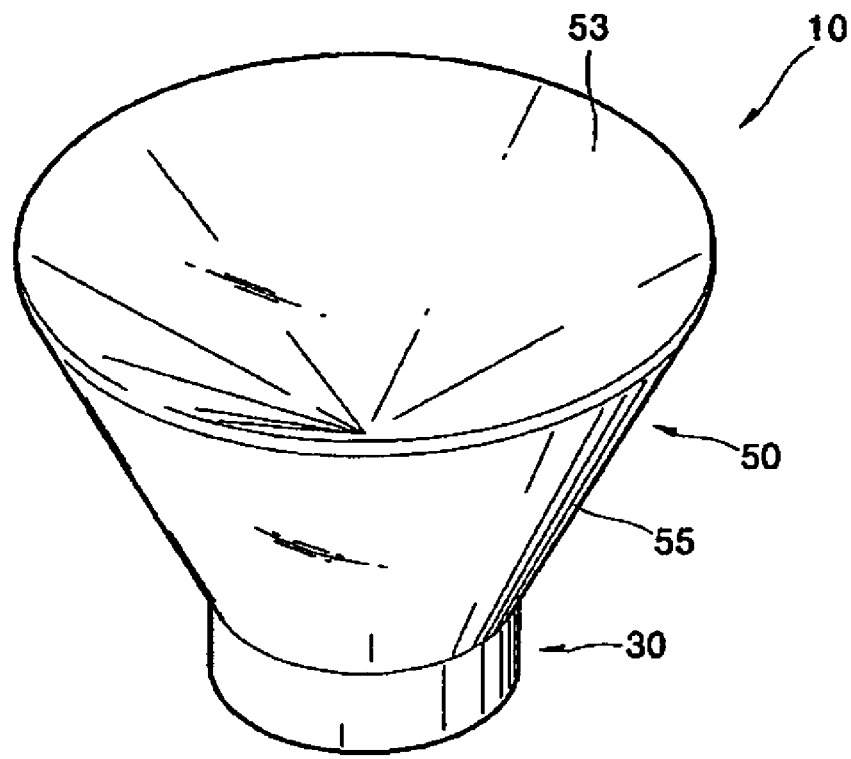
FIG. 2 is a schematic perspective view of a side light-emitting device according to a an embodiment of the present general inventive concept.
Figure 3:
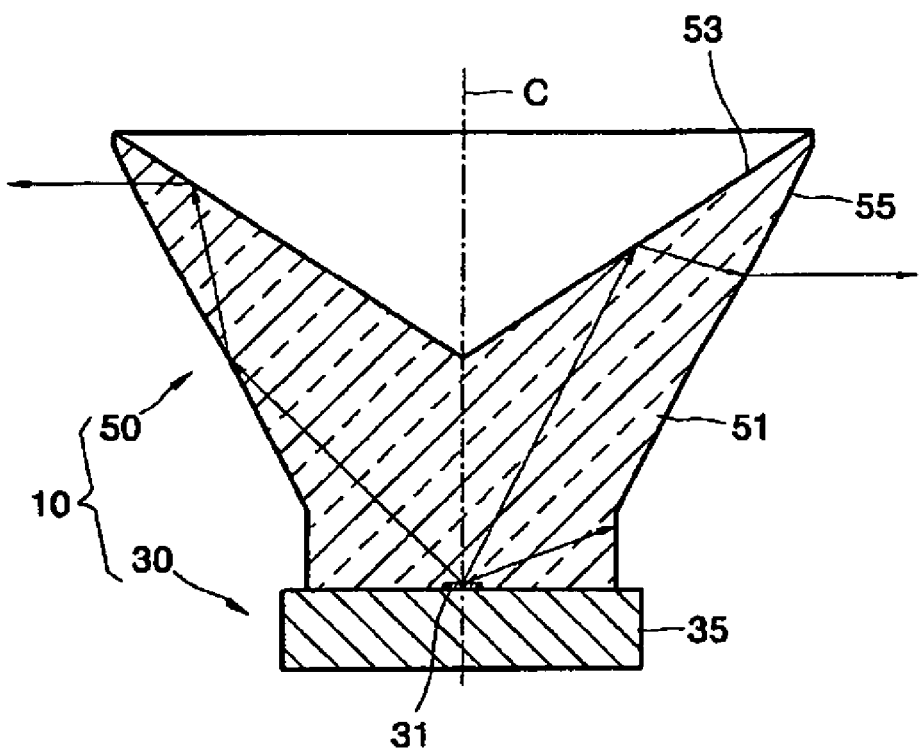
FIG. 3 is a side view of the side light-emitting device of FIG. 1.

Referring to FIGS. 2 and 3, a side light-emitting device 10 includes a light-emitting device 30 generating light and a side emitter 50 emitting light incident from the light-emitting device 30 in a lateral direction.

A principal propagation direction of light emitted from the light-emitting device 30 substantially corresponds to a central axis C of the side light-emitting device 10. The lateral direction is a direction parallel or close to a horizontal axis that is perpendicular to the central axis C. Here, the central axis C is an axis that crosses a center of a light-emitting diode (LED) chip 31, which will be described later, and the side emitter 50.

The light-emitting device 30 includes the LED chip 31 generating light and is combined with the side emitter 50 when the LED chip 31 is mounted on a base 35. The LED chip 31 may adhere closely to the side emitter 50 in order to maximize the amount of light that is emitted by the LED chip 31 into the side emitter 50.

The side emitter 50 includes a transparent body 51 made of a transparent material such as a transparent plastic material, a reflecting surface 53 reflecting incident light, and a reflecting/refracting surface 55 totally internally reflecting light incident directly from the light-emitting device 30 to the reflecting surface 53 and refracting the light incident from the reflecting surface 53.

The reflecting surface 53 and the reflecting/refracting surface 55 are the surfaces of the transparent body 51.

Light emitted from the light-emitting device 30 into a region of the side emitter 50 closer to the central axis C is directly incident on the reflecting surface 53. On the other hand, light emitted from the light-emitting device 30 into a region of the side emitter 50 that is farther away from the central axis C is incident on the reflecting/refracting surface 55 and is totally internally reflected by the reflecting/refracting surface 55 to the reflecting surface 53.

When the light-emitting device 30 is disposed below the side emitter 50, the reflecting surface 53 corresponds to a top surface of the side emitter 50 and may be a conical surface centered on the central axis C so as to reflect incident light rays in a direction away from the central axis C. The reflecting surface 53 may be planar or concavely curved. The reflecting surface 53 may be obtained by applying reflective coating to the top surface of the side emitter 50 in order to reflect the incident light rays.

The reflecting/refracting surface 55 corresponds to sides of the side emitter 50 and is obliquely inclined with respect to the central axis C so that light directly incident from the light-emitting device 30 is totally internally reflected to the reflecting surface 53 and light reflected by the reflecting surface 53 is refracted to exit the side emitter 50 in the lateral direction. More specifically, the reflecting/refracting surface 55 is an inclined surface that widens away from the central axis C as a distance from the light-emitting device 30 increases.

The reflecting/refracting surface 55 is treated as a mirror surface without a reflective coating since it satisfies a condition for total internal reflection.

The reflecting/refracting surface 55 is formed as a planar surface to correspond to the outside of circular truncated cone. Alternatively, the reflecting/refracting surface 55 may be curved.

The region of the side emitter 50 that is closer to the central axis C in which the incident light is directly incident on the reflecting surface 53 may be in the range of about 45° to about 135° with respect to the horizontal axis including an origin at a light-emitting point of the light-emitting device 30, i.e., the center of the LED chip 31. On the other hand, the region of the side emitter 50 that is farther away from the central axis C in which the incident light is totally internally reflected by the reflecting/refracting surface 55 may be in the ranges of about 10° to about 45° and of about 135° to about 170° with respect to the horizontal axis including the origin at the light-emitting point of the light-emitting device 30, i.e., the center of the LED chip 31.

That is, the reflecting surface 53 and the reflecting/refracting surface 55 may be formed such that light within the range of about 45° to about 135° with respect to the horizontal axis including the origin at the center of the LED chip 31 is directly incident on the reflecting surface 53 while light within the ranges of about 10° to about 45° and of about 135° to about 170° is totally internally reflected by the reflecting/refracting surface 55 to the reflecting surface 53 and the light reflected by the reflecting surface 53 is refracted by the reflecting/refracting surface 55.

The ranges of the regions closer to or farther away from the central axis C may vary depending on the designs of the reflecting surface 53 and the reflecting/refracting surface 55.

The reflecting surface 53 and the reflecting/refracting surface 55 are made symmetric about the central axis C so that the side emitter 50 can emit light incident from the light-emitting device 30 uniformly in the lateral direction.

The side light-emitting device 10 having the above-mentioned configuration is able to emit most of the light in the lateral direction, i.e., the direction of the horizontal axis. Thus, when the side light-emitting device 10 is used as a point light source in a backlight unit, it can scatter light over a broader area, thereby reducing a thickness of the backlight unit. Furthermore, since the side emitter 50 with the reflecting surface 53 and the reflecting/refracting surface 55 has a simple structure, the side light emitting device 10 is easy to manufacture.

Figure 4A:
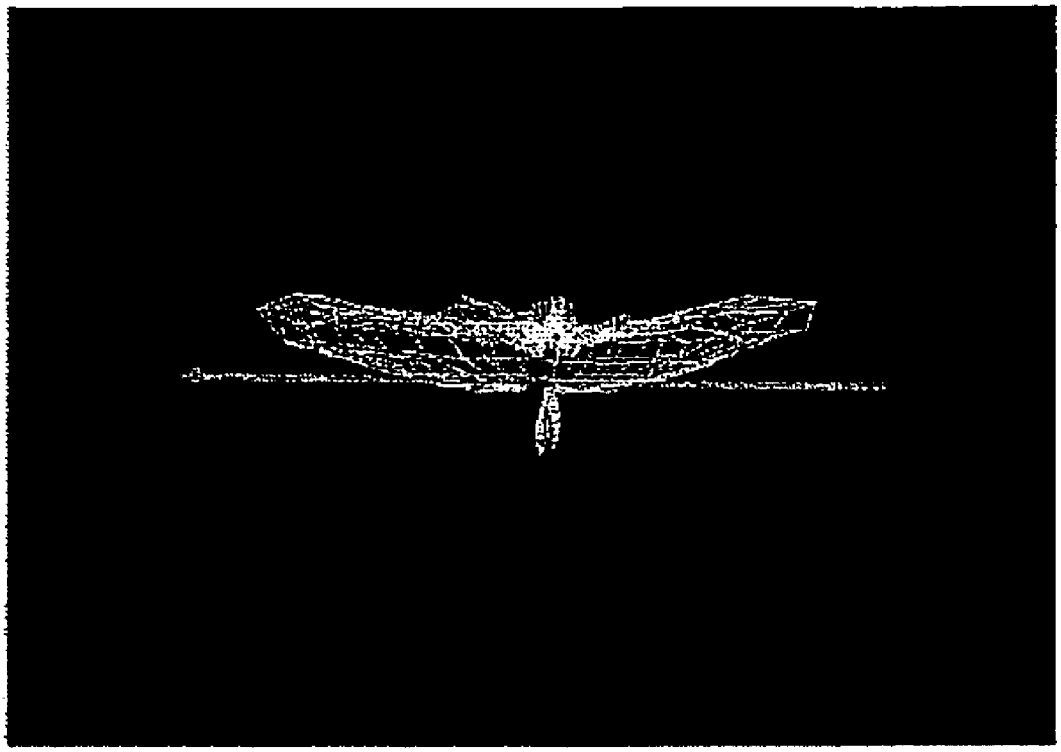
FIG. 4A illustrates an intensity distribution of light emitted from the conventional side emitter of the side-emitting LED of FIG. 1
Figure 4B:
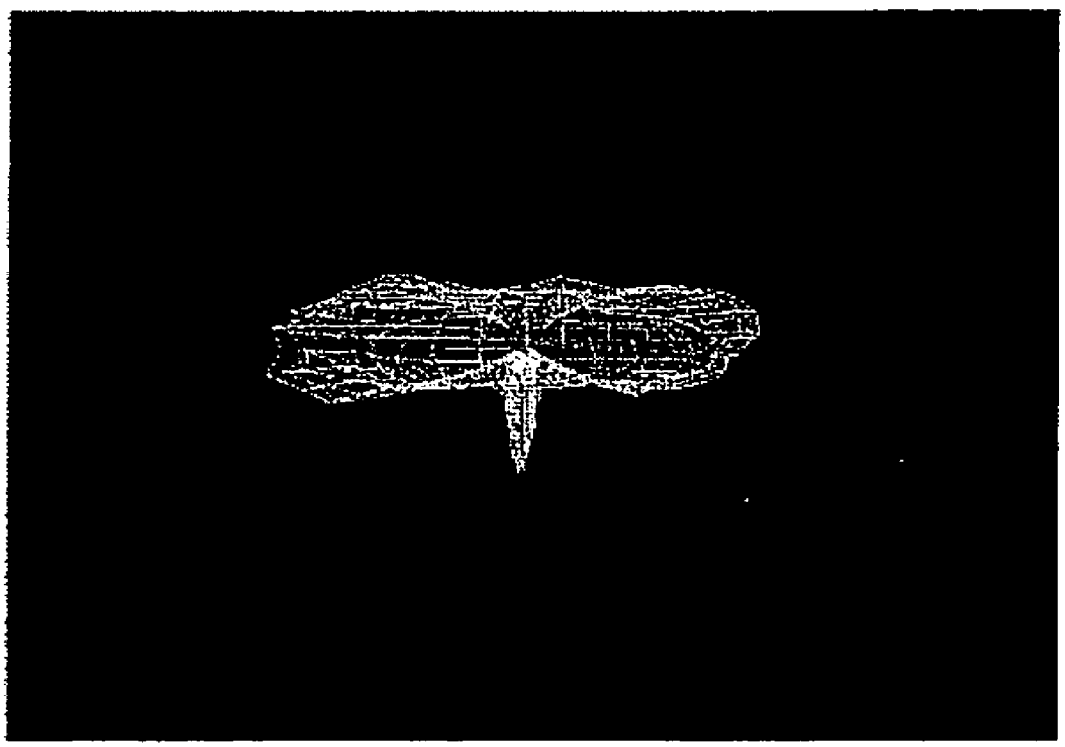
FIG. 4B illustrates an intensity distribution of light emitted from a side emitter of the side light-emitting device of FIGS. 2 and 3 according to an embodiment of the present general inventive concept.

FIG. 4A illustrates an intensity distribution of light emitted by the conventional side emitter 1 of the side-emitting LED of FIG. 1, and FIG. 4B illustrates an intensity distribution of light emitted by the side emitter 50 of the side light-emitting device 10 illustrated in FIGS. 2 and 3 according to an embodiment of the present general inventive concept.

As illustrated in FIG. 4, in the conventional side emitter 1, light propagating at about 10° upward from the horizontal axis has the highest intensity. Thus, when the conventional side-emitting LED is used in a backlight unit, a distance between a side-emitting LED and a transparent diffusion plate must be increased in order to widely scatter light. That is, in order to provide uniform screen brightness using the conventional side-emitting LED, the thickness of the backlight unit should be significantly increased.

On the other hand, as illustrated in FIG. 4B, in the side light-emitting device 10 according to the various embodiments of the present general inventive concept, light propagating in the lateral direction nearly parallel to the horizontal axis has the highest intensity. A significant amount of light is also distributed in upward and downward lateral directions that are close to the horizontal axis. The side light-emitting device 10 spreads light out over a sufficiently wide area, thereby allowing the distance between the transmissive diffusion plate and the side-emitting LED to be small. Thus, a slim backlight unit and uniform screen brightness can be provided.

Figure 5:
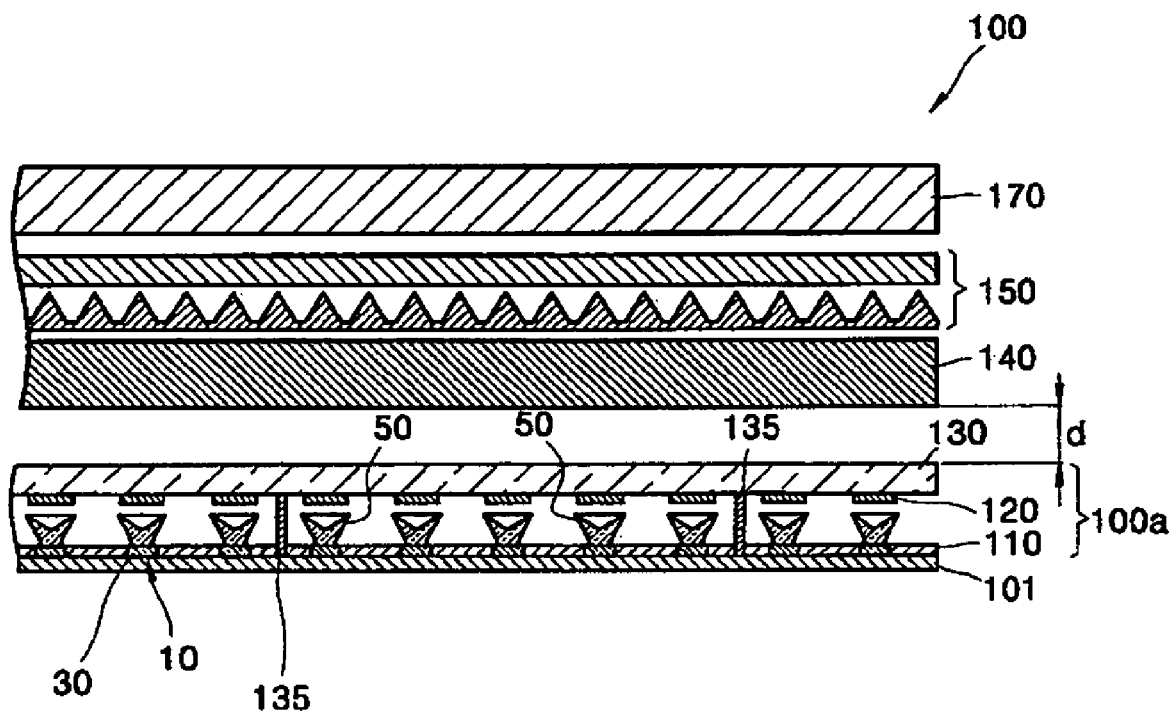
FIG. 5 schematically illustrates a backlight unit having an array of side light-emitting devices according to an embodiment of the present general inventive concept.

FIG. 5 schematically illustrates a backlight unit 100 having an array of side light-emitting devices 10 according to an embodiment of the present general inventive concept. Referring to FIG. 5, the backlight unit 100 includes a plurality of side light-emitting devices 10 arranged in an array on a base plate 101, a reflective diffusion plate 110 that is disposed below the plurality of side light-emitting devices 10 that reflects and diffuses light propagating from the side light-emitting devices 10, and a transmissive diffusion plate 140 that is disposed above the side light-emitting devices 10 that transmits and diffuses incident light.

The base plate 101 serves as a substrate on which the plurality of side light-emitting devices 10 are arranged in an array. The side light-emitting devices 10 include light emitting devices 30 and side emitters 50. The base plate 101 may be a printed circuit board (PCB) for driving the side light-emitting device 10. Alternatively, the backlight unit 100 may include the base plate 101 and a PCB for driving the side light-emitting devices 10 separately.

The side light-emitting device 10 has the same configuration as the counterpart illustrated in FIGS. 2 and 3 and allows most of the Lambertian light from the LED chip 31 (see FIGS. 2 and 3) disposed at a lower portion thereof to be emitted by the side emitter 50 in the lateral direction.

The array of the plurality of side light-emitting devices 10 may include side light-emitting devices alternately arranged, each emitting a red (R), green (G), or blue (B) color beam. In this case, each of the side light-emitting devices 10 includes the LED chip 31 generating R, G, or B color beam.

The array of the side light-emitting devices 10 is arranged into a plurality of lines. The number of the side light-emitting devices 10 for each color beam arranged on each line may vary depending on an intensity of the color beam emitted therefrom.

The intensities of R, G, and B color beams emitted from the corresponding LED chips 31 may be different from one another. For example, the intensity of a beam emitted from the green LED chip 31 may be lower than that of a beam emitted from the red or blue LED chip 31. Thus, a number of red light-emitting device units for each line may be equal to that of blue light-emitting device units, and a number of green light-emitting device units may be double the number of red or blue light-emitting device units. The red, green, and blue light-emitting device units may, for example, be arranged on each line in the order of R, G, G, B or B, G, G, R.

Alternatively, the side light-emitting devices 10 may all emit white light. In this case, each of them may include the LED chip 31 generating white light.

When the backlight unit 100 includes an array of the alternatively arranged side light-emitting devices 10, containing the LED chips 11 generating R, G, and B color beams, or when the backlight unit 100 includes an array of the plurality of side light-emitting devices 10 with the LED chips 11 generating white light, an LCD apparatus employing the backlight unit 100 enables a display of a color image.

The reflective diffusion plate 110 reflects and diffuses incident light so that the reflected light propagates upward. The reflective diffusion plate 110 is disposed on the base plate 101 below the side light-emitting devices 10. The reflective diffusion plate 110 has a plurality of holes in which the corresponding side light-emitting devices 10 can be disposed. The reflective diffusion plate 110 is disposed on the base plate 101 with the side light-emitting devices 10 being inserted into the plurality of holes.

Here, most of the light emitted from the side emitters 50 in the side light-emitting devices 10 propagate over a long distance and is then incident on the reflective diffusion plate 110. Some of the light emitted from the side emitters 50 propagates a long distance and is then incident on a reflecting mirror 120 (described below) disposed above the side light-emitting devices 10 or on the transmissive diffusion plate 140 disposed above the reflecting mirror 120.

Thus, the light incident onto the reflective diffusion plate 110 is directly emitted from the side emitter 50 or is reflected by the reflecting mirror 120 to the reflective diffusion plate 110.

The transmissive diffusion plate 140 is spaced upward apart from a lower portion 100a of the backlight unit 100, i.e., the side light-emitting devices 10 and the reflective diffusion plate 110, by a predetermined distance "d." The transmissive diffusion plate 140 transmits and diffuses the incident light.

In this case, when the transmission diffusion plate 140 is too close to the side light-emitting devices 10, a region where the side light-emitting device 10 is located appears brighter than a remaining region, resulting in a degradation of brightness uniformity. Furthermore, when a distance between the transmissive diffusion plate 140 and the side light-emitting device 10 increases, the thickness of the backlight unit 100 increases. Thus, the predetermined distance "d" between the transmissive diffusion plate 140 and the lower portion 100a of the backlight unit 100 including the side light-emitting devices 10 and the reflective diffusion plate 110 may be minimized within a range in which light can be mixed sufficiently, as desired.

The backlight unit 100 using the side light-emitting devices 10 emitting light over a wide area as a light source has a thickness that is less than a thickness of a conventional backlight unit using conventional side-emitting LEDs as light sources, because light rays can be mixed sufficiently even when a distance between the side light-emitting devices 10 and the transmissive diffusion plate 140 is decreased.

While most of the light generated by the light-emitting devices 30 in the side light-emitting devices 10 is emitted by the side emitters 50 in the lateral direction, light propagating upward from the side emitters 50 may also be present when the reflecting surfaces 53 (see FIGS. 2 and 3) of the side emitters 50 is not a totally reflecting surface. Since coating conditions for forming a totally reflecting surface are difficult to satisfy, the reflecting surface 53 is coated to have an appropriate reflectance. As can be seen in FIG. 4B, some of the light directly propagates upward from the side emitters 50.

Due to the presence of the light traveling upward from the side emitters 50, a light spot located at a position of the LED chip 31 may be visible from above the backlight unit 100. Furthermore, when R, G, and B LED chips 31 emitting color beams are used to display a color image, the colors of the LED chips 31 can be seen from above the backlight unit 100.

Thus, in order to prevent the above problems resulting from the presence of light propagating upward from the side emitters 50, the backlight unit 100 further includes a plurality of reflecting mirrors 120 that are disposed on one surface of an optical plate 130 to reflect light emitted directly upward from the side light-emitting devices 10. An array of the plurality of reflecting mirrors 120 corresponding to the array of the side light-emitting devices 10 are arranged on the surface of the optical plate 130. That is, each of the plurality of reflecting mirrors 120 is disposed above the corresponding side light-emitting device 10.

The optical plate 130 on which the plurality of reflecting mirrors 120 are arranged is made of transparent polymethyl methacrylate (PMMA) to transmit incident light. Alternatively, the optical plate 130 may be a transmissive diffusion plate (i.e., a second transmissive diffusion plate).

In this case, each of the plurality of reflecting mirrors 120 may be spaced apart from the corresponding side light-emitting device 10 by a predetermined distance. In order to maintain the predetermined distance, the optical plate 130 may be supported by a support 135. The support 135 supports the optical plate 130 relative to the reflective diffusion plate 110 or the base plate 101.

Using the second transmissive diffusion plate as the optical plate 130 allows light to be spread out sufficiently compared to when only the reflective diffusion plate 110 and the transmissive diffusion plate 140 are used, thereby reducing the distance between the transmissive plate 140 and the side light-emitting device 10, i.e., the predetermined distance "d" between the transmissive diffusion plate 140 and the lower portion 100a of the backlight unit 100. This results in a further reduction in the thickness of the backlight unit 100.

When the second transmissive diffusion plate is used as the optical plate 130, transmittance of light is lower than when transparent PMMA is used. Thus, either the second transmissive diffusion plate or the transparent PMMA may be selected as the optical plate 130 depending on whether or not reducing the thickness of the backlight unit 100 is more important than increasing light emission rate.

The backlight unit 100 may further include a brightness enhancement film (BEF) 150 for improving the directionality of light beams passing through the transmissive diffusion plate 140 and a polarization enhancement film 170 for increasing polarization efficiency.

The BEF 150 is used to refract and focus the light beams passing through the transmissive diffusion plate 140 and enhance the directionality of the light, thereby increasing brightness of the light beams. The polarization enhancement film 170 transmits light beams having a predetermined polarization, e.g., a p-polarized light beam, while reflecting light beams having another predetermined polarization, e.g., an s-polarized light beam, thus allowing most of the incident light beams to be converted into p-polarized beams as the light beams pass through the polarization enhancement film 170.

Figure 6:
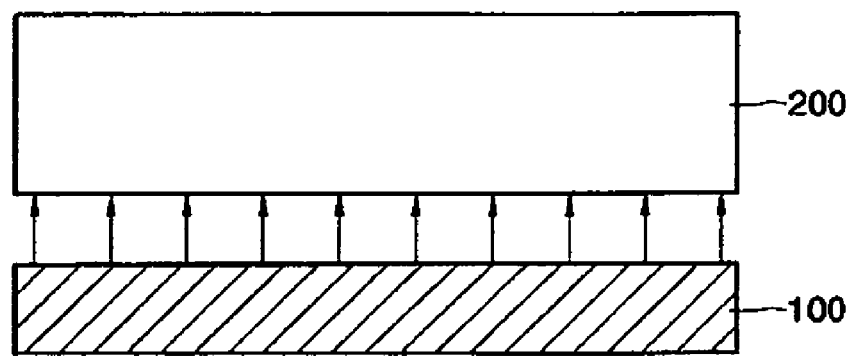
FIG. 6 schematically illustrates a liquid crystal display (LCD) apparatus including the backlight unit of FIG. 5.

FIG. 6 schematically illustrates a liquid crystal display (LCD) apparatus including the backlight unit of FIG. 5.

Referring to FIG. 6, the liquid crystal display (LCD) apparatus includes the backlight unit 100 and a liquid crystal panel 200 disposed above the backlight unit 100. Light beams that are linearly polarized pass through a liquid crystal layer in a liquid crystal panel, a direction of a liquid crystal director is changed by an applied electric field so that the polarization of the light beams is changed, thereby enabling image information to be displayed on the liquid crystal panel 200. The liquid crystal panel 200 is coupled to a driving circuitry. Since the detailed configuration of the liquid crystal panel 200 and display operation using the driving circuitry is known in the art, a description thereof will not be provided.

Since the efficiency of light utilization is improved when light incident on the liquid crystal panel 200 has single polarization state, using the polarization enhancement film 170 in the backlight unit 100 can increase optical efficiency.

As described above, the backlight unit 100 includes an array of side light-emitting devices 10 as point light sources, emitting most of the light in the approximately lateral direction so that the light can be spread out widely. The backlight unit 100 having the above configuration has a sufficiently reduced thickness while providing uniform light intensity distribution across the entire surface.

Thus, the LCD apparatus employing the backlight unit 100 enables the display of high quality images with uniform brightness across the entire screen.

Since a side light-emitting device according to the present general inventive concept can emit most light in a lateral direction, using the side light-emitting device as a light source in a backlight unit allows light to be mixed evenly. Additionally, the side light-emitting device has a simple structure making it is easy to manufacture.

The present general inventive concept provides a slim backlight unit using a side light-emitting device as a point light source, which can offer high quality light with uniform intensity distribution across an entire surface and has a thickness that is less than a conventional backlight unit. The present general inventive concept also provides an LCD apparatus employing the backlight unit producing a high quality image with uniform brightness across an entire screen.

Since a side light-emitting device according to the present general inventive concept having a simple structure is easy to manufacture, the backlight unit including the side light-emitting device and the LCD apparatus employing the backlight unit can be manufactured at significantly low costs.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A side light-emitting device, comprising:
a light-emitting device to generate light; and
a side emitter disposed adjacent to the light emitting device and to emit the light incident from the light-emitting device in a lateral direction, the side emitter including:
a reflecting surface to reflect the incident light, and
a surface that is inclined so as to widen away from the central axis of the side light emitting device as a distance from the light-emitting device increases, the surface to internally reflect the light incident directly from the light-emitting device to the reflecting surface and to refract light incident from the reflecting surface so that the refracted light propagates in the lateral direction.

2. The device of claim 1, wherein the reflecting surface is coated with reflective coating.

3. The device of claim 2, wherein the reflecting surface comprises a conical surface centered around a central axis of the side light-emitting device to reflect the incident light in a direction away from the central axis.

4. The device of claim 1, wherein the reflecting surface and the surface are formed such that while first light within a first range at about 45° to about 135° with respect to a horizontal axis including an origin at a light-emitting point of the light-emitting device is directly incident on the reflecting surface, the horizontal axis being perpendicular to a central axis of the side light-emitting device, second light within second ranges of about 10° to about 45° and of about 135° to about 170° with respect to the horizontal axis is incident on the surface so that the incident light is internally reflected by the surface to the reflecting surface.

5. The device of claim 1, wherein the reflecting surface and the surface are symmetric about a central axis of the side light-emitting device.

6. A backlight unit, comprising:
a base plate;
an array of side light-emitting devices disposed on the base plate, each of the side light-emitting devices comprising:
a light-emitting device to generate light, and
a side emitter disposed adjacent to the light emitting device and to emit the light incident from the light-emitting device in a lateral direction, and the side emitter includes a reflecting surface to reflect the incident light, and a surface that is inclined so as to widen away from a central axis of the side light emitting device as a distance from the light-emitting device increase, the surface to internally reflect the light incident directly from the light-emitting device to the reflecting surface and to refract light incident from the reflecting surface so that the refracted light propagates in the lateral direction;
a reflective diffusion plate disposed below the array of side light-emitting devices that reflects and diffuses incident light; and
a first transmissive diffusion plate disposed above the array of side light-emitting devices that transmits and diffuses incident light.

7. The backlight unit of claim 6, wherein the reflecting surface is coated with reflective coating.

8. The backlight unit of claim 7, wherein the reflecting surface comprises a conical surface centered around a central axis of the side light-emitting device to reflect incident light in a direction away from the central axis.

9. The backlight unit of claim 6, wherein the reflecting surface and the surface are formed such that while first light within a first range of about 45° to about 135° with respect to a horizontal axis including an origin at a light-emitting point of the light-emitting device is directly incident on the reflecting surface, the horizontal axis being perpendicular to a central axis of the side light-emitting device, second light within second ranges of about 10° to about 45° and of about 135° to about 170° with respect to the horizontal axis is incident on the surface so that the incident light is internally reflected by the surface to the reflecting surface.

10. The backlight unit of claim 6, wherein the reflecting surface and the surface are symmetric about a central axis of the side light-emitting device.

11. The backlight unit of claim 6, wherein the array of the side light-emitting devices includes alternately arranged side light-emitting devices emitting red, green, blue color beams, respectively, or side light-emitting devices emitting white light.

12. The backlight unit of claim 6, further comprising:
an optical plate disposed between the first transmissive diffusion plate and the array of side light-emitting devices; and
a plurality of reflecting mirrors disposed on one surface of the optical plate to reflect light emitted directly upward from corresponding ones of the side light-emitting devices.

13. The backlight unit of claim 12, wherein the optical plate comprises one of a transparent polymethyl methacrylate (PMMA) and a second transmissive diffusion plate.

14. The backlight unit of claim 6, further comprising:
at least one of a brightness enhancement film (BEF) In improve a directionality of light beams passing through the first transmissive diffusion plate and a polarization enhancement film to increase efficiency of polarization.

15. A liquid crystal display apparatus, comprising:
a liquid crystal panel; and
a backlight unit to emit light beams on the liquid crystal panel, the backlight unit comprising:
a base plate,
an array of side light-emitting devices disposed on the base plate, each of the side light-emitting devices including:
a light-emitting device to generate light, and
a side emitter disposed adjacent to the light emitting device and to emit the light incident from the light-emitting device in a lateral direction, and the side emitter includes a reflecting surface to reflect the incident light, and a surface that is inclined so as to widen away from a central axis of the side light emitting device as a distance from the light-emitting device increases, the surface to internally reflect light incident directly from the light-emitting device to the reflecting surface and to refract the light incident from the reflecting surface so that the refracted light propagates in the lateral direction,
a reflective diffusion plate disposed below the array of side light-emitting devices that reflects and diffuses incident light, and
a first transmissive diffusion plate disposed above the array of side light-emitting devices that transmits and diffuses incident light.

16. The apparatus of claim 15, wherein the reflecting surface is coated with reflective coating.

17. The apparatus of claim 16, wherein the reflecting surface comprises a conical surface centered around a central axis of each of the side light-emitting devices to reflect incident light in a direction away from the central axis.

18. The apparatus of claim 15, wherein the reflecting surface and the surface are formed such that while first light within a first range of about 45° to about 135° with respect to a horizontal axis including an origin at a light-emitting point of the light-emitting device is directly incident on the reflecting surface, the horizontal axis being perpendicular to a central axis of the side light-emitting device, second light within second ranges of about 10° to about 45° and of about 135° to about 170° with respect to the horizontal axis is incident on the surface so that the incident light is internally reflected by the surface to the reflecting surface.

19. The apparatus of claim 15, wherein the reflecting surface and the surface are symmetric about a central axis of the side light-emitting device.

20. The apparatus of claim 15, wherein the array of the side light-emitting devices includes alternately arranged side light-emitting devices emitting red, green, blue color beams, respectively, or side light-emitting devices emitting white light.

21. The apparatus of claim 15, further comprising:
an optical plate disposed between the first transmissive diffusion plate and the array of side light-emitting devices; and
a plurality of reflecting mirrors disposed on one surface of an optical plate to reflect light emitted directly upward from corresponding ones of the side light-emitting devices.

22. The apparatus of claim 21, wherein the optical plate comprises one of a transparent polymethyl methacrylate (PMMA) and a second transmissive diffusion plate.

23. The apparatus of claim 15, further comprising:
at least one of a brightness enhancement film (BEF) to improve directionality of light beams passing through the first transmissive diffusion plate and a polarization enhancement film to increase efficiency of polarization.

24. A side light emitting device, comprising:
a side emitter having a central axis, a reflective surface extending radially from the central axis at a first incline with respect to a lateral axis perpendicular to the central axis, and a surface connected at a periphery of the reflective surface and aligned coaxially therewith, the surface being arranged at a second incline with respect to the lateral axis to refract first light beams reflected thereto from the reflective surface out of the side emitter along the lateral axis and to reflect second light beams received from a point light source to the reflective surface.

25. A side light emitting device, comprising:
a point light source; and
a side emitter having an inner surface to reflect light and an outer surface to reflect a first one or more light beams and to refract a second one or more light beams, and the inner and outer surfaces extend away from a central axis of the side light emitting device and have a predetermined distance therebetween that continuously decreases as the inner and outer surfaces extend away from the central axis of the side light emitting device.

26. A side light emitting device, comprising:
a base; and
a side emitter, including:
a transparent body, the transparent body being bound at an upper part by a reflective surface to reflect light incident thereon and bound at a lateral part by a surface to refract the light reflected by the reflective surface out of the lateral part and to reflect light not reflected by the reflective surface theretoward, the reflective surface and the surface joining at a portion of the transparent body that is furthest from a central axis thereof.

27. A side emitter usable in a side light emitting device, comprising:
a transparent body having a base surface through which beam are received from a point light source with the transparent body extending away from a central axis as a distance from the base increases, a first boundary surface to reflect the beams received from the point light source, and a second boundary surface connected to the first boundary surface and the base surface to refract beams received from the first boundary surface and to reflect beams received from the point light source to the first boundary surface.

28. A side emitter, comprising:
a base;
a point light source disposed on the base; and
a body, including:
a first upper surface having a first cone shape having a first angle with respect to a central axis thereof, and
a second lateral surface having a second cone shape having a second angle with respect to the central axis thereof and extending to the base, the first upper surface having the first cone shape being positioned entirely within the second lateral surface having the second cone shape.

29. A side emitter usable in a backlight unit, the side emitter comprising:
a transparent body, including:
a base;
an upper funnel shaped surface to reflect beams received from a point light source; and
at least one planar lateral surface that extends away from a central axis as a distance from the base increases, the at least one planar lateral surface to connect the upper funnel shaped surface to the base to refract beams received from the upper funnel shaped surface and to reflect beams received from the point light source to the upper funnel shaped surface.

30. A side emitter usable with a backlight, the side emitter comprising:
a light source to emit first and second beams in first and second direction; and
a body having first and second surfaces to form respective external boundaries thereof, the second surface extending away from a central axis as distance from a base increase, the second surface reflecting the second beam toward the first surface, the first surface reflecting the first beam and the second beam reflected from the second surface toward the second surface, and the second surface refracting the reflected first beam and the reflected second beam in a lateral direction out of the external boundaries of the body.

31. The side emitter of claim 30, wherein the body comprises a third surface on which the first and second beams are dispersed.

32. The side emitter of claim 30, wherein the first surface forms an angle with a center line of the body that is perpendicular to the lateral direction, and the second surface forms a second angle with the center line.

33. The side emitter of claim 32, wherein the first angle is greater than the second angle.

34. A side light-emitting device, comprising:
a multi-directional light source aligned on a central axis to emit first and second light rays;
an optical medium optically coupled with the light source to receive the first and second light rays thereinto, the optical medium bounded by:
a first surface axially aligned on the central axis and having an apex directed towards the light source;
a second surface axially aligned on the central axis to join the first surface at a common circular periphery, the second surface defining a circular periphery proximal to the light source and smaller in diameter than the common circular periphery,
wherein:
the first light rays traverse the optical medium to be reflected by the first surface toward the second surface;
the second light rays traverse the optical medium to be reflected by the second surface towards the first surface;
the second light rays reflected by the second surface and incident on the first surface are reflected back through the optical medium to the second surface; and
any light ray in the optical medium reflected from the first surface and incident on the second surface is refracted perpendicularly to the central axis.

35. The side light-emitting device of claim 34, wherein the second light rays emanate from the light source 45° to 80° with respect to the central axis and are exclusive of the first light rays.

36. The side light-emitting device of claim 34, wherein the second surface is curved.

37. The side light-emitting device of claim 34, wherein the second surface is a right circular conic surface.

38. The side light-emitting device of claim 34, wherein the first surface is a right circular conic surface.

* * * * *